US011037057B1

(12) United States Patent
Virbila et al.

(10) Patent No.: US 11,037,057 B1
(45) Date of Patent: Jun. 15, 2021

(54) COGNITIVE SIGNAL PROCESSOR

(71) Applicant: HRL Laboratories, LLC, Malibu, CA (US)

(72) Inventors: Gabriel L. Virbila, Venice, CA (US); Peter Petre, Oak Park, CA (US); Bryan H. Fong, Los Angeles, CA (US); Shankar R. Rao, Agoura Hills, CA (US); Daniel S. Matic, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 741 days.

(21) Appl. No.: 15/910,821

(22) Filed: Mar. 2, 2018

Related U.S. Application Data

(60) Provisional application No. 62/500,889, filed on May 3, 2017.

(51) Int. Cl.
*H04B 1/719* (2011.01)
*G06N 3/08* (2006.01)
*G06N 5/02* (2006.01)

(52) U.S. Cl.
CPC .............. *G06N 3/08* (2013.01); *G06N 5/022* (2013.01); *H04B 1/719* (2013.01)

(58) Field of Classification Search
CPC ........... G06N 3/08; G06N 5/022; H04B 1/719
USPC ............................................ 375/130; 342/378
See application file for complete search history.

(56) References Cited

U.S. PATENT DOCUMENTS 8,031,117 B2 * 10/2011 Goldberg ................. H04B 7/10
  342/378
2012/0232418 A1 * 9/2012 Kimura ............... A61B 5/02411
  600/528

OTHER PUBLICATIONS

H. Jaeger, et al. "Harnessing nonlinearity: Predicting chaotic systems and saving energy in wireless communications," Science, vol. 304, No. 5667, pp. 78-80, 2004.
R. Legenstein, et al. "Edge of Chaos and Prediction of Computational Performance for Neural Microcircuit Models," Neural Networks 20 (2007), pp. 323-334.
W. Maass, "Liquid Computing", Proc. of the Conference CiE'07: Computability in Europe, 2007, Siena (Italy), CiE 2007, LNCS 4497, pp. 507-516, 2007.

(Continued)

*Primary Examiner* — Fitwi Y Hailegiorgis
(74) *Attorney, Agent, or Firm* — Tope-McKay & Associates

(57) ABSTRACT

Described is a cognitive signal processor that is implemented in a field programmable gate array (FPGA). During operation, the FGPA receives a continuous noisy signal. The continuous noisy signal is a time-series of data points from a mixture signal of waveforms having both noise and a desired waveform signal. The continuous noisy signal is linearly mapped to reservoir states of a dynamical reservoir. A high-dimensional state-space representation of the continuous noisy signal is generated by digitally combining the continuous noisy signal with the reservoir states. Notably, the continuous noisy signal is approximated over a time interval based on a linear basis function. One or more delay-embedded state signals are then generated based on the reservoir states. The continuous noisy signal is then denoised by removing the noise from the desired waveform signal, resulting in a denoised waveform signal.

21 Claims, 15 Drawing Sheets

(56) References Cited

OTHER PUBLICATIONS

F. Takens, "Detecting Strange Attractors in Turbulence," Dynamical Systems and Turbulence, Lecture Notes in Mathematics vol. 898, 1981, pp. 366-381.

D. Verstraeten, et al. "An experimental unification of reservoir computing methods", Neural Networks vol. 20, No. 3, Apr. 2007, pp. 391-403.

R. Walden, "Analog-to-digital converter survey and analysis," IEEE J. Sel. Areas Commun., vol. 51, pp. 539-548, 1999.

* cited by examiner

| Verilog Module | Description |
|---|---|
| predictive_filter20poles.v | Top level module used to hold all other modules providing basic input and output, including clock, reset and enable. Stores history of state outputs in shift registers. |
| state_variable.v | Computes the next state based on the input and current state. |
| ck_variable.v | Used to compute and update output layer weights based on current weights and stored history of states. The number of ck modules used is based on the delay embedding factor. |
| output_layer.v | Multiplies and sums each ck times the stored history of xk. |

FIG. 7A

COGNITIVE SIGNAL PROCESSOR

CROSS-REFERENCE TO RELATED APPLICATIONS

This application claims the benefit of and is a non-provisional patent application of U.S. Provisional Application No. 62/500,889, filed on May 3, 2017 the entirety of which is hereby incorporated by reference.

GOVERNMENT RIGHTS

This invention was made with government support under U.S. Government Contract N00014-12-C-0027. The government has certain rights in the invention.

BACKGROUND OF INVENTION

(1) Field of Invention

The present invention relates to a system for signal denoising and, more particularly, to a cognitive signal processor for denoising a signal that contains a mixture of waveforms over an ultra-wide bandwidth.

(2) Description of Related Art

State-of-the-art systems for detecting, localizing, and classifying source emitters from passive radio frequency (RF) antennas over an ultra-wide bandwidth (>30 Gigahertz (Ghz)) require high rate analog-to-digital converters (ADC). Such high-rate ADCs are expensive and power hungry; due to fundamental physical limits (such as the Walden curve described in Literature Reference No. 6 of the List of Incorporated Literature References), they are not capable of achieving the sampling rate needed to capture the ultra-wide bandwidth. To mitigate this, state-of-the-art electronic support measure (ESM) systems use either spectrum sweeping (which is too slow to handle agile emitters) or a suite of digital channelizers, which have large size, weight, and power requirements. In addition, the detection, localization, and classification algorithms used in state-of-the-art ESM systems are typically based on the fast Fourier transform, with high computational complexity and memory requirements that make it difficult to operate them in real-time over an ultra-wide bandwidth.

Conventional methods for denoising fall into two categories: filter-based methods and training-based approaches. Filter-based methods use filtering to smooth out noise from a signal, but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. In addition, the dictionary often requires a large amount of memory and computation to be stored and leveraged on the platform, making such approaches infeasible for ultra-low SWaP (size, weight, and power) systems.

Thus, a continuing need exists for a signal denoising system that does not require offline training and can efficiently operate over a wide bandwidth.

SUMMARY OF INVENTION

This disclosure provides a cognitive signal processor (CSP) that is implemented in a field programmable gate array (FPGA). During operation, the FPGA receives a continuous noisy signal. The continuous noisy signal is a time-series of data points from a mixture signal of waveforms having both noise and a desired waveform signal. The continuous noisy signal is linearly mapped to reservoir states of a dynamical reservoir. A high-dimensional state-space representation of the continuous noisy signal is generated by digitally combining the continuous noisy signal with the reservoir states. Notably, the continuous noisy signal is approximated over a time interval based on a linear basis function. One or more delay-embedded state signals are then generated based on the reservoir states. The continuous noisy signal is then denoised by removing the noise from the desired waveform signal, resulting in a denoised waveform signal. The denoised waveform signal is then further analyzed by means known to those skilled in the art of signals analysis and may be displayed on a Display Device for visualization by a user and other analysts.

In another aspect, the dynamical reservoir includes an output layer having a set of summing nodes, each summing node receiving a weighted output from each delay-embedded state signal and summing the weighted output to generate the denoised waveform signal.

In yet another aspect, the dynamical reservoir includes an error function used to create the weighted output, the error function being a difference between a current continuous noisy signal and a current output layer.

In yet another aspect, the error function updates weights used in generating the weighted output, the weights being updated with the error function based on gradient descent.

In another aspect, the CSP performs an operation of generating a real-time denoised spectrogram of the continuous noisy signal for further processing.

In another aspect, the CSP and or other processors display at least one of the denoised waveform signal and the real-time denoised spectrogram on a Display Device.

In yet another aspect, the dynamical reservoir is a recurrent neural network with a plurality of nodes.

In another aspect, the dynamical reservoir includes a connectivity matrix having a block diagonal structure.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is a table illustrating a list of Verilog files used to create HDL models of a predictive filter;

DETAILED DESCRIPTION

Figure 1:
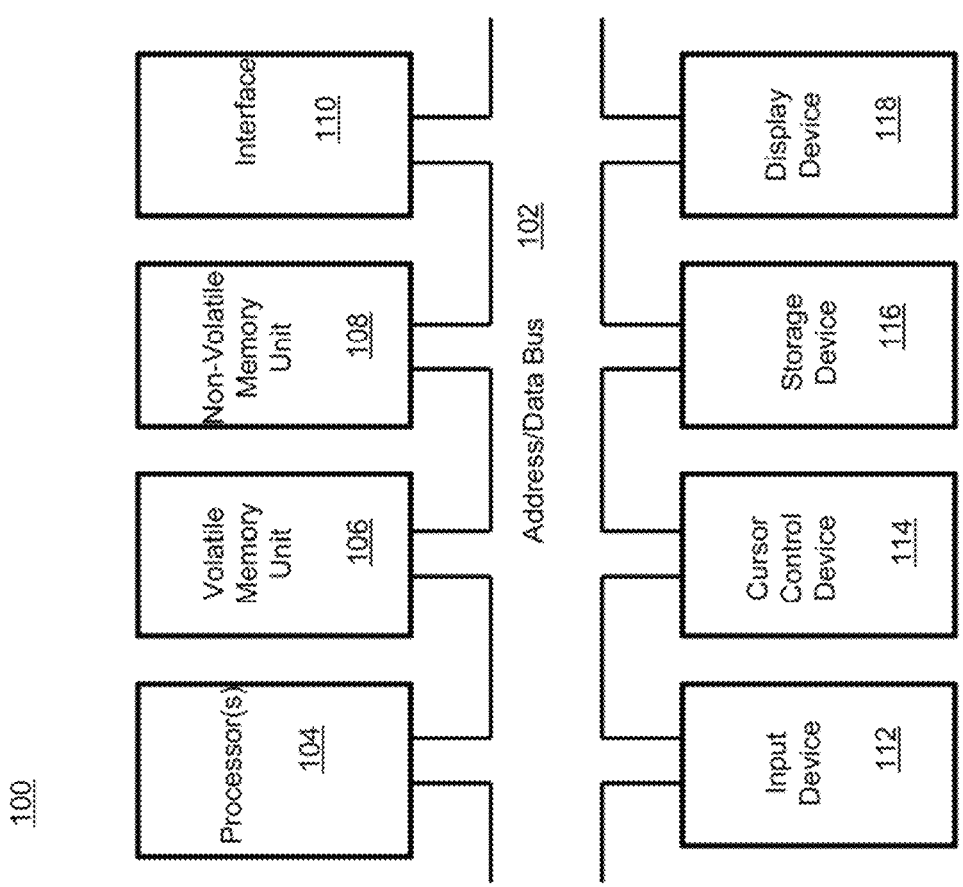
FIG. 1 is a block diagram depicting the components of a system according to various embodiments of the present invention.

The present invention relates to a system for signal denoising and, more particularly, to a cognitive signal processor for denoising a signal that contains a mixture of waveforms over an ultra-wide bandwidth. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. H. Jaeger, et al. "Harnessing nonlinearity: Predicting chaotic systems and saving energy in wireless communications," Science, vol. 304, no. 5667, pp. 78-80, 2004.
2. R. Legenstein, et al. "Edge of Chaos and Prediction of Computational Performance for Neural Microcircuit Models," Neural Networks, 20(3), 2007.
3. W. Maass, "Liquid Computing", Proc. of the Conference CiE'07: Computability in Europe, 2007, Siena (Italy).
4. F. Takens, "Detecting Strange Attractors in Turbulence," Dynamical Systems and Turbulence, Lecture Notes in Mathematics Vol. 898, 1981.
5. D. Verstraeten, et al. "An experimental unification of reservoir computing methods", Neural Networks, vol. 20, no. 3, April 2007.
6. R. Walden, "Analog-to-digital converter survey and analysis," IEEE J. Sel. Areas Commun., vol. 51, pp. 539-548, 1999.

(2) Principal Aspects

Various embodiments of the invention include three "principal" aspects. The first is a system for signal denoising. The system can be formed as a cognitive signal processor and is typically in the form of a computer system operating software or in the form of a "hard-coded" instruction set and includes any of the necessary hardware or other components as may be needed to perform the functions and/or operations as listed herein. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, and without implying a limitation, the processor 104 may be a different type of processor such as a neuromorphic processor, a parallel processor, application-specific integrated circuit (ASIC), programmable logic array (PLA), complex programmable logic device (CPLD), or a field programmable gate array (FPGA). A skilled person in the art of signal denoising will appreciate that the innovations in this disclosure may be embodied in various hardware implementations including but not limited to the foregoing. The foregoing implementations will be collectively referenced herein by FPGA.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
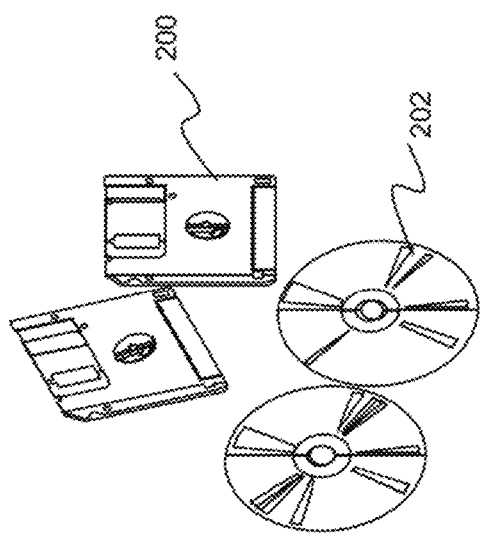
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a "cognitive" signal processor (CSP) that can denoise an input signal that contains a mixture of waveforms over a very large bandwidth. The CSP or system uses a reservoir computer having a block diagonal structure for its reservoir connectivity matrix. The block diagonal structure requires a number of multiplications that scale linearly with the number of reservoir nodes, and is thus far more efficient to implement in low SWaP hardware than any prior art signal denoising systems.

The CSP includes three primary components. The first component is a reservoir computer (RC), which is the cognitive-inspired aspect of the CSP. The dynamic reservoir computer maps an input signal to a high-dimensional dynamical system known as the reservoir. The reservoir connectivity weights have been optimized for the task of signal denoising. The second component is a delay embedding component that creates a finite temporal record of the values of the reservoir states. The third component is a weight adaptation module that adapts the output of the reservoir via gradient descent to produce a prediction of the input signal a small time step in the future. Since the noise in the input signal is inherently random and unpredictable, the predicted input signal will be free of noise. The error between the predicted input signal and actual input is used by the weight adaptation module to further tune the output weights of the reservoir in an iterative process.

The CSP described herein exhibits five advantages in challenging denoising scenarios relative to current state-of-the-art methods. First, because the CSP performs adaptive filtering, its hardware-based embodiment requires much less weight and power than current brute-force channelization methods. Second, it can cover an ultrawide bandwidth, and yet still exhibit very low latencies. Third, the CSP can perform this denoising operation using only a single input antenna. Fourth, the CSP is capable of denoising signals in real-time using a constraint that covers a wide range of electromagnetic and acoustic signals of interest. Many other current approaches use powerful, but computationally expensive constraints, such as signal complexity measures, or rely on loose constraints, such as filter banks, which may be less computationally expensive but have limited capacity to capture the structure of real-world source signals. In contrast, the CSP of this disclosure utilizes the constraint that the waveforms of interest in a source signal can be linearly predicted over a short interval of time, which can be computed quickly with limited computational cost. Finally, in the deterministically designed reservoir of the CSP, the reservoir states each correspond to the amount of input signal energy near a particular frequency. This enables the CSP to generate a real-time spectrogram of a complex input signal that can be implemented efficiently in hardware.

As can be appreciated by those skilled in the art, there are a number of applications in which the present invention can be implemented. For example, the CSP can implemented in Electronic Support Measures (ESM) receivers (e.g., such as those developed by Argon ST) and within any other system in which it may be desirable to perform real-time processing of signals over an ultra-wide bandwidth. The CSP provides expanded situational awareness, providing the core functionality required for ultra-low latency signal detection and analysis over large instantaneous bandwidth to enable real-time resource allocation based on the particular radio frequency (RF) environment. Without implying a limitation, real-time resources includes further signal analysis assets and resources such as aircraft, drones, ships, and other vehicles either collecting the noisy signals or responding to the analysis of the denoised signals. This performance can be achieved on computing platforms with orders of magnitude lower size, weight, and power.

The CSP is also applicable to vehicle applications, enabling cognitive radio in low signal-to-noise ratio (SNR) conditions. The CSP can also be used in vehicle manufacturing, helping to significantly denoise the control signal used for automated welding in the factory. The additional capability of the CSP to generate a real-time spectrogram will further facilitate situational awareness for airborne platforms and autonomous cars.

The system is also applicable to vehicle (e.g., UAV, plane, car, boat, robot) or man-portable applications, such as rapid detection and separation of significant objects (e.g., obstacles, terrain, other vehicles, persons, animals) from clutter from radar antenna signals. As a non-limiting example, once the denoised waveform signal is generated, the sought-after or otherwise identified object can be located using imagery, triangulation or any other suitable technique, with assets then being deployed to the object's location. Such deployment can include causing an autonomous drone to physically maneuver above the object's location for surveillance purposes, etc.

As another example, in autonomous vehicle operation, cars or other vehicles may use radars to detect and avoid obstacles. Due to clutter, such as trees, other cars, and walls, the radar returns for obstacles may be weak relative to other returns within the spectrum and also be obscured by them. In one aspect, the system described herein can be used to denoise radio frequency (RF) signals, such as those collected by radar receivers (e.g., antenna, sensors, etc.). Separation of significant object pulses from clutter pulses reduces the likelihood that the autonomous vehicle will be confused by clutter and can then effectively detect and avoid a significant object. For example, once a significant object is detected based on the denoised signal, the system can cause a vehicle to act (by being connected with an appropriate vehicle control system) based on the significant object, such as slowing, accelerating, stopping, turning, and/or otherwise maneuvering around the significant object. Other actions based on the obstacle are also possible, such as causing the vehicle to inform or warn a vehicle occupant and/or vehicle operator about the obstacle with an audible warning, a light, text, and/or an image, such as a radar display image. For further examples, the system may generate commands and control operations of vehicle systems that can be adjusted, such as vehicle suspension or safety systems such as airbags and seatbelts, etc. Yet another example application includes being used in vehicle manufacturing by helping to significantly denoise the control signal used for automated welding in the factory. Specific details regarding the CSP are provided below.

(4) Specific Details of Various Embodiments

As noted above, the cognitive signal processor (CSP) denoising architecture includes three primary components. The first component is a reservoir computer (RC), which is the "neuromorphic" (brain-inspired) aspect of the signal denoising system. The reservoir computer accepts the mixture signals as input and maps it to a high-dimensional dynamical system known as the reservoir. The RC has a predefined number of outputs, which are generated by continually mapping the reservoir states through a set of distinct linear functions with one such function defined per output. The second component is a delay embedding component. The reservoir state signals are continuously passed through the delay embedding, which creates a finite temporal record of the values of the reservoir state. The third component is a weight adaptation module that adapts the output of the reservoir via gradient descent to produce a prediction of the input signal a small time step in the future. Since the noise in the input signal is inherently random and unpredictable, the predicted input signal will be free of noise. The error between the predicted input signal and actual input is used by the weight adaptation module to further tune the output weights of the reservoir in an iterative process, resulting in a clean or denoised output signal. These aspects are described in further detail below.

(4.1) Reservoir Computing

The cognitive signal denoising architecture described herein is based on a form of neuromorphic (brain-inspired) signal processing known as reservoir computing (RC) (see Literature Reference Nos. 1-3 for a description of reservoir computing). A RC is a special form of a recurrent neural network (a neural network with feedback connections) that operates by projecting the input signal vector into a high-dimensional reservoir state space, which contains an equivalent dynamical model of the signal generation process capturing all of the available and actionable information about the input. A reservoir has readout layers that can be adapted, either off-line or on-line, to learn desired outputs by utilizing the state functions. Thus, an RC has the power of recurrent neural networks to model non-stationary (time-varying) processes and phenomena, but with simple readout layers and adaptation algorithms that are both accurate and efficient.

Benchmark results in several application areas demonstrate the effectiveness of RCs. RCs have achieved orders of magnitude better performance than state-of-the-art methods for chaotic time series prediction, have outperformed hidden Markov model (HMM)-based speech recognition systems on small vocabulary, and perform better than conventional methods for digit recognition (see Literature Reference No. 5). There is a strong connection between reservoir computing and state-space filtering. Conventional RF/microwave filters typically implement the Laplace domain filtering algorithm according to the following:

$$s\underline{x}(s) = \underline{A}\underline{x}(s) + \underline{B}u(s),$$
$$y(s) = \underline{C}^T \underline{x}(s) + Du(s),$$

where $\underline{x}(s)$, $u(s)$, and $y(s)$ are the state-space representations of the reservoir state, input signal, and output, respectively.

Figure 3:
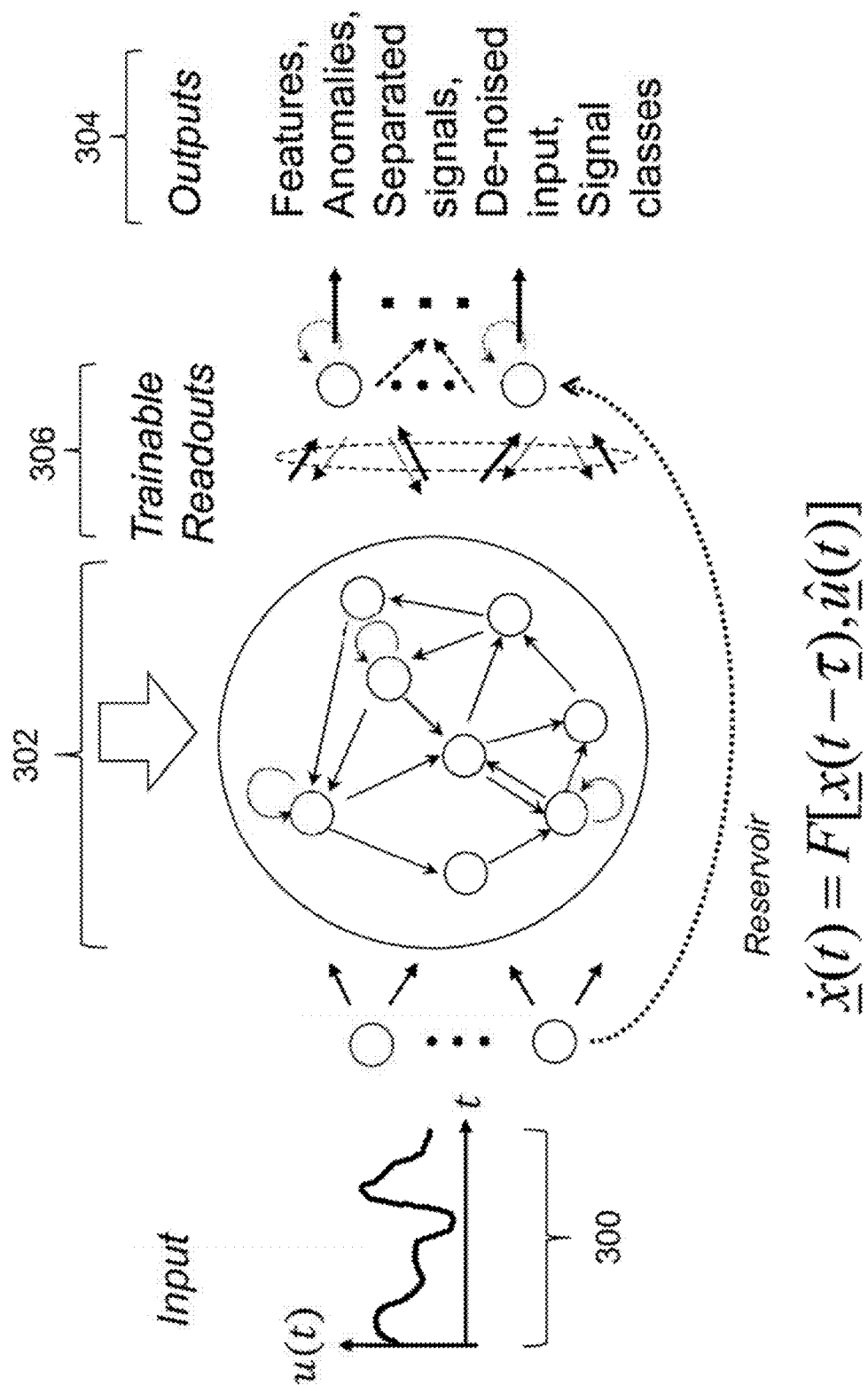
FIG. 3 is an illustration of a reservoir computer, depicting an input signal vector being mapped to a high-dimensional state-space that models the underlying time-varying dynamics of a signal generation process.

As depicted in FIG. 3, a reservoir computer maps an input signal vector 300 to a high-dimensional state-space 302 that models the underlying time-varying dynamics of the signal general process. The reservoir states from the state-space 302 can be mapped to useful outputs 304, including denoised outputs, signal classes, separated signals, and anomalies using adaptable linear readout layers 306.

Figure 4A:
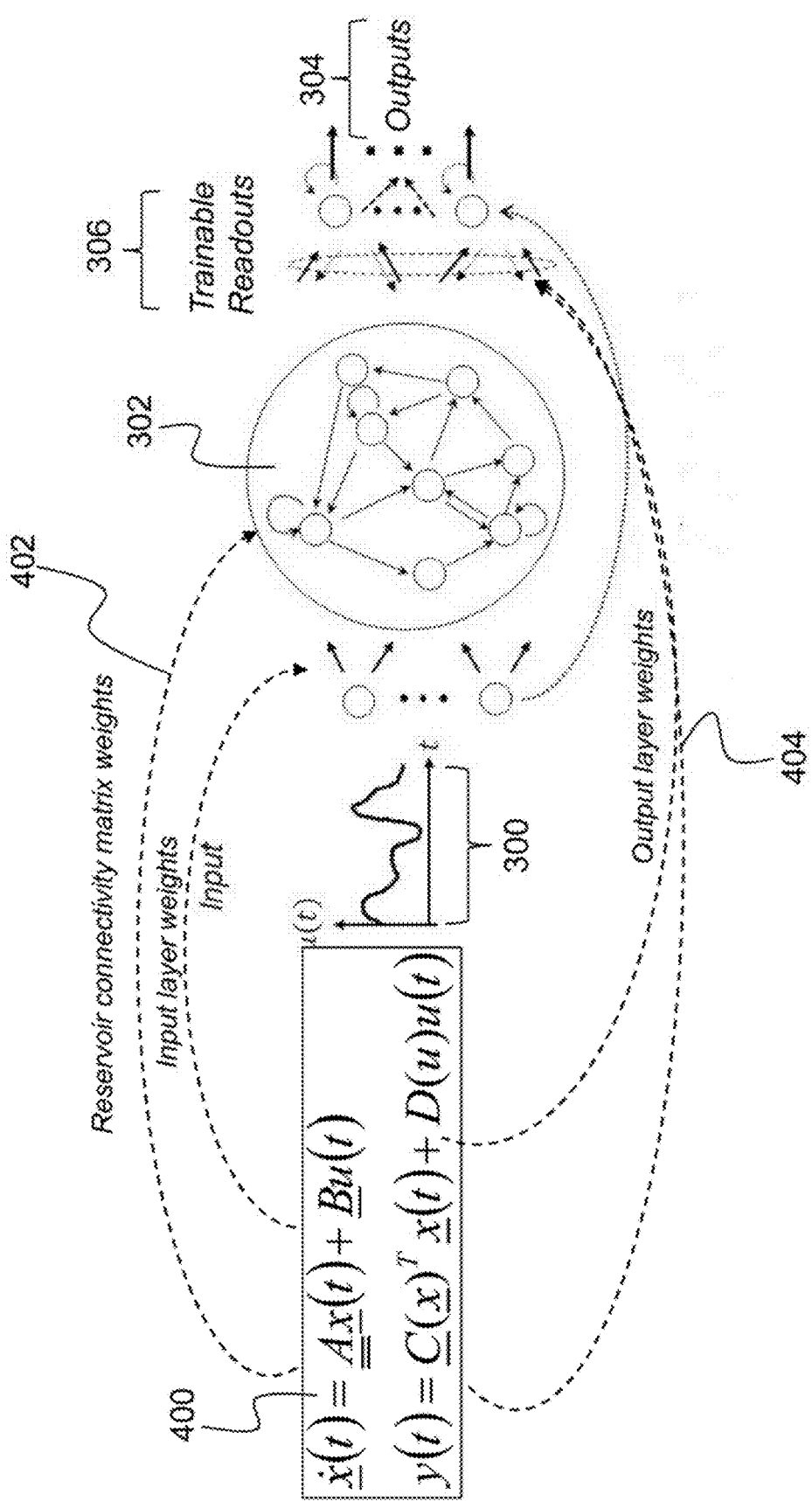
FIG. 4A is an illustration depicting a correspondence between state-space representation components and parameters in the reservoir computer.

A state space filter implements a time-domain filtering algorithm 400, and as shown in FIG. 4A, the different components of the state-space representation (element 302) have a direct correspondence with different parameters in the reservoir computer. FIG. 4A illustrates the correspondence between state-space representation (element 302) components and parameters in the reservoir computer.

In particular, the reservoir connectivity matrix weight ($\underline{A}$) (element 402) determines the filter pole locations. Similarly, the output layer weights (C) (element 404) determine the filter zero locations. As the output layer weights (element 404) are adaptable, a reservoir computer can implement an adaptable (nonlinear) state-space filter.

(4.2) Hardware-Efficient Reservoir Design

In conventional reservoir computers, the weights in both the reservoir connectivity matrix ($\underline{A}$) and the input-to-reservoir mapping matrix ($\underline{B}$) are typically chosen randomly. As a nonlimiting example, the entries of $\underline{A}$ and $\underline{B}$ can independent, identically distributed samples from a zero-mean, unit variance Gaussian distribution. Such random reservoir weight matrices have been successfully used in many previous applications. However, to implement such a reservoir in low-power hardware (e.g., an FPGA or digital ASIC), the reservoir state update require computation proportional to the square of the number of nodes, which become infeasible as the number of reservoir node increases. For example, for a reservoir with 100 nodes, prior art reservoirs require 1000 multiplications per iteration of the reservoir, while the reservoir of the present disclosure requires only 200 multiplications per iteration.

(4.2.1) Discretization of Reservoir State Dynamics

This section details how to map the continuous state-space representation of the dynamic reservoir and convert it to an efficient discretized iteration that can be implemented in software, FPGAs, or custom digital ASICs. This section specifies the $\tilde{A}$ and $\tilde{B}$ in the iteration in FIG. 6.

The ordinary differential equations (ODEs) for the dynamic reservoir and the weight adaptation system can be implemented directly in analog hardware. To implement the above ODEs in software or efficient digital hardware (e.g., field-programmable gate arrays (FPGAs) or custom digital application-specific integrated circuits (ASICs)), the update equations must be discretized.

For implementing the process in digital software or hardware, the ODEs are converted to delay difference equations (DDEs). For a linear dynamical system with the state-space representation:

$$\dot{\underline{x}}(t) = \underline{A}\underline{x}(t) + \underline{B}u(t)$$
$$y(t) = \underline{C}(t)^T \underline{x}(t) + D(t)u(t),$$

Given the discrete time-step size $\tau$, the equivalent DDE is obtained that describes the exact same filter dynamics:

$$\underline{x}(t) = e^{\underline{A}\tau} = \underline{x}(t-\tau) + \int_{t-\tau}^{t} e^{\underline{A}(t-s)} u(s) ds \cdot \underline{B}$$
$$y(t) = \underline{C}(t)^T \underline{x}(t) + D(t)u(t),$$

Figure 4B:
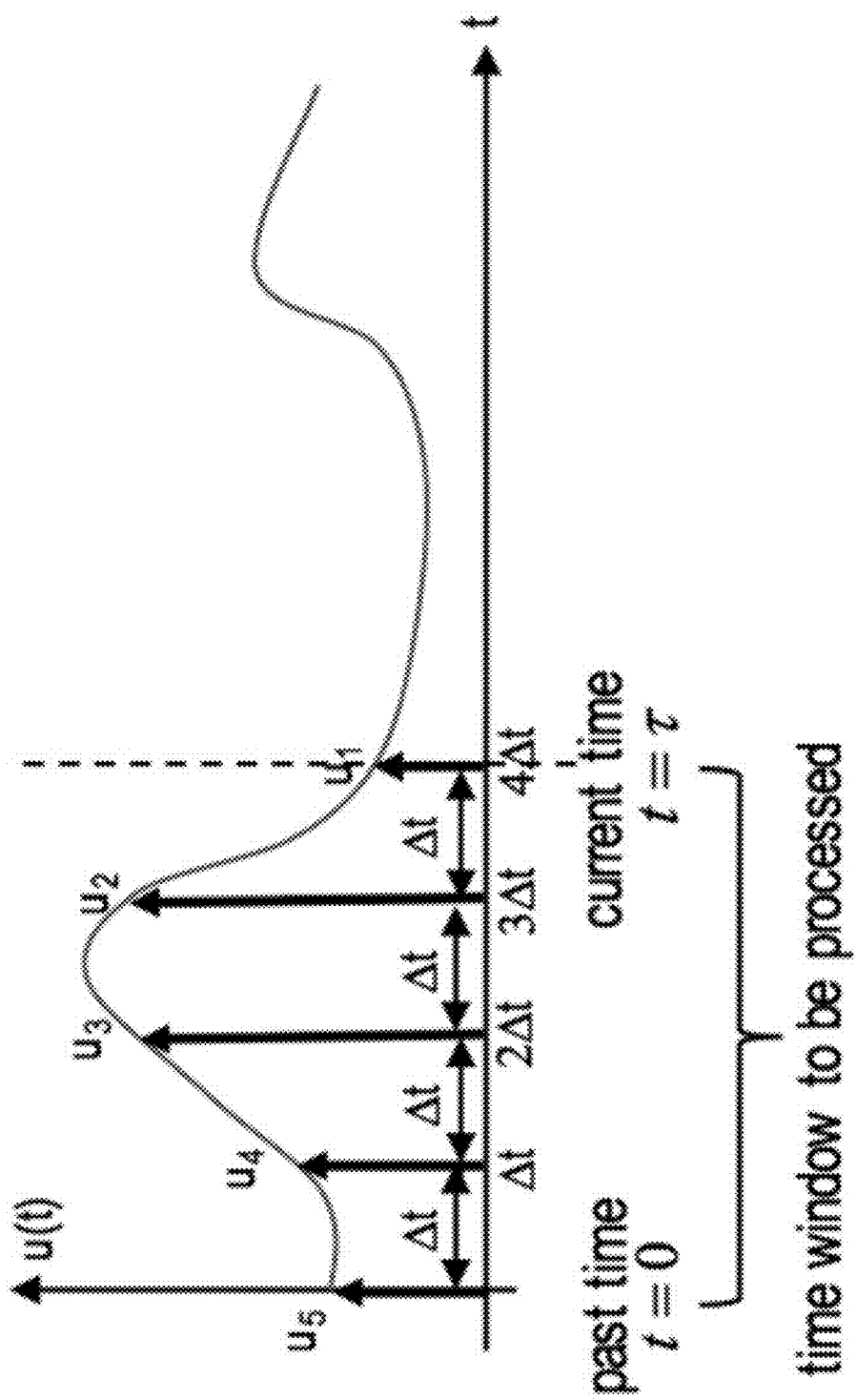
FIG. 4B is a chart illustrating a uniformly sampled u(t) with sampling period Δt.
Figure 4C:
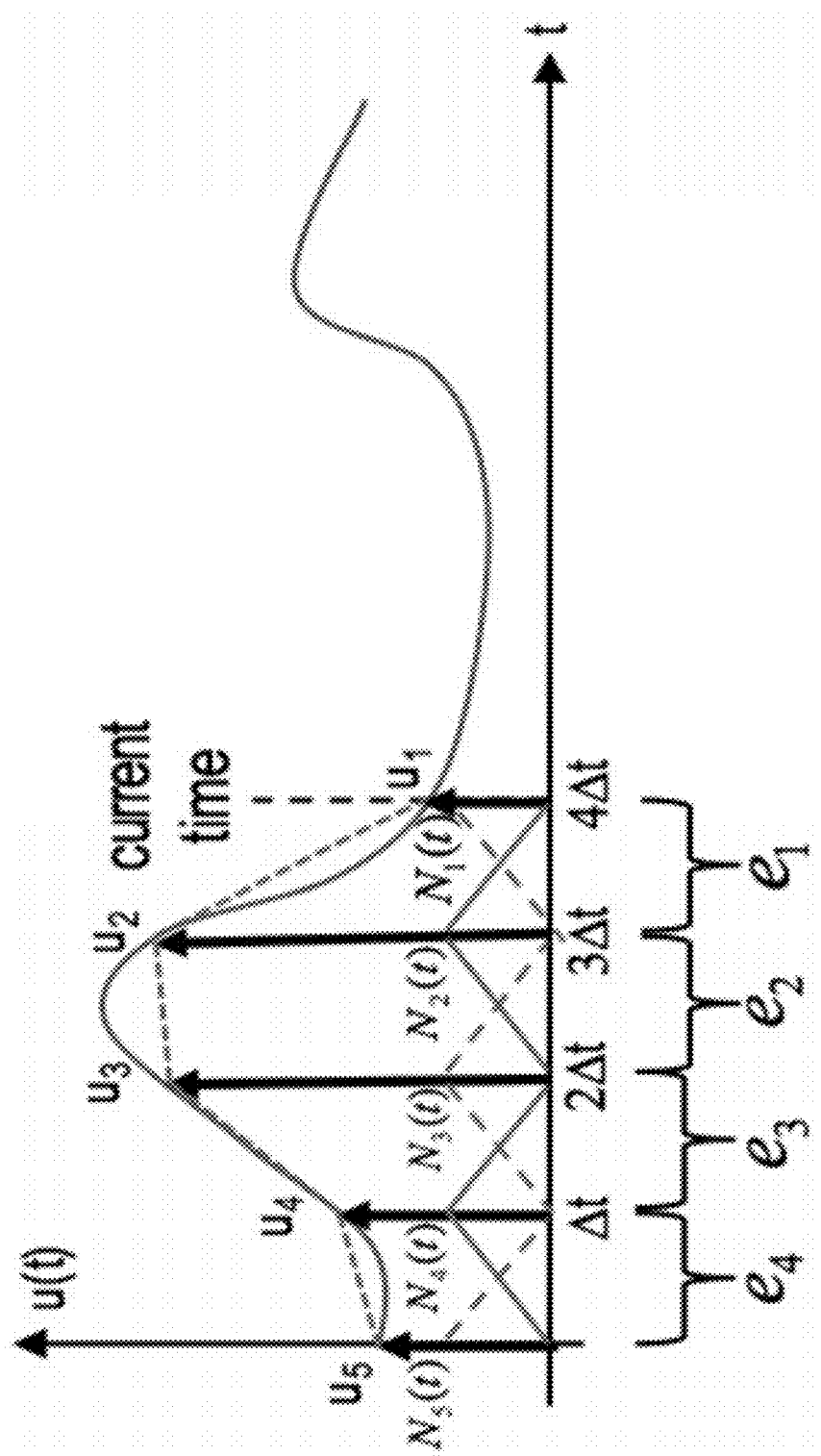
FIG. 4C is a chart illustrating linear basis functions for approximating u(t)

This shows that the current reservoir state $\underline{x}(t)$ is a function of the reservoir state at the previous time step $\underline{x}(t-\tau)$ and the input signal $u(t)$ over the interval $[t-\tau, t]$. Since the entire continuous interval is not available in software or digital hardware, in the digital CSP, $u(t)$ is approximated over the interval using linear basis functions. Given the sampling period $\Delta t$, $u(t)$, a set of $$n_e = \frac{\tau}{\Delta t}$$

are collected, where $$u_i \stackrel{def}{=} u(t-(i-1)\Delta t), 1 \le i \le n_e + 1,$$

in the number of sampling intervals within the time window defined by τ (see FIG. 4B). As seen in FIG. 4C, the input signal is approximated from the samples as $u(t) \approx \sum_{i=1}^{n_e+1} u_i N_i(t)$, where $N_i(t)=T(t-(i-t)\Delta t)$ is a shifted version of the triangle function T(t):

$$T(t) = \begin{cases} 1 - t/\Delta t & 0 \le t \le \Delta t \\ 1 + t/\Delta t & -\Delta t \le t \le 0 \\ 0 & \text{otherwise} \end{cases}$$

Based on the linear basis approximation, the DDE for the reservoir state x(t) becomes:

$$x(t) = e^{\underline{A}\tau} = x(t-\tau) + \sum_{i=1}^{n_e+1} \left\{ u_i \int_{t-\tau}^{t} e^{\underline{A}(t-s)} N_i(s) ds \cdot \underline{B} \right\}$$

Without loss of generality, set t=τ. Define the two auxiliary matrices $\underline{B}_{1e}^i$ and $\underline{B}_{2e}^i$ $$\underline{B}_{1e}^i \stackrel{def}{=} e^{\underline{A}(i-1)\Delta t} \int_0^\tau e^{\underline{A}(\tau-s)} N_1(s) ds \cdot \underline{B} = \frac{e^{\underline{A}(i-1)\Delta t}}{\Delta t} \underline{A}^{-2}(e^{\underline{A}\Delta t} - \Delta t \underline{A} - I)\underline{B}$$

$$\underline{B}_{1e}^i \stackrel{def}{=} e^{\underline{A}(i-1)\Delta t} = \int_0^{e^{\underline{A}(\tau-s)}} N_2(s) ds \cdot \underline{B} =$$

$$e^{\underline{A}(i-1)\Delta t} = \left\{ \underline{A}^{-1}(e^{\underline{A}\Delta t} - I) - \frac{1}{\Delta t} A^{-2} = (e^{\underline{A}\Delta t} - \Delta t \underline{A} - I) \right\} B,$$

then x(τ) can be computed as:

x(t) =

$$x(n_e \Delta t) = \underbrace{e^{\underline{A}\tau}}_{\tilde{A}} x(0) + \underbrace{[\underline{B}_{1e}^1, (\underline{B}_{2e}^1 + \underline{B}_{1e}^2), \ldots, (\underline{B}_{2e}^{n_e-1} + \underline{B}_{1e}^{n_e}), \underline{B}_{2e}^{n_e}]}_{\tilde{B}} \begin{bmatrix} u_1 \\ u_2 \\ \vdots \\ u_{n_e} \\ u_{n_e+1} \end{bmatrix}$$

Based on this, iterative updates are derived for the state (x), output (y), and weights ($\{\underline{c}_k\}_{k=1}^{K+1}$, d), which are summarized in FIGS. 4B and 4C.

(4.3) Hardware Implementation of Cognitive Signal Denoising Architecture

This section describes how the denoising algorithm can be implemented on hardware by using either a field-programmable gate array (FPGA) or an application-specific integrated circuit (ASIC). This general approach could be used for a system having any number of poles and bit-widths.

Figure 5:
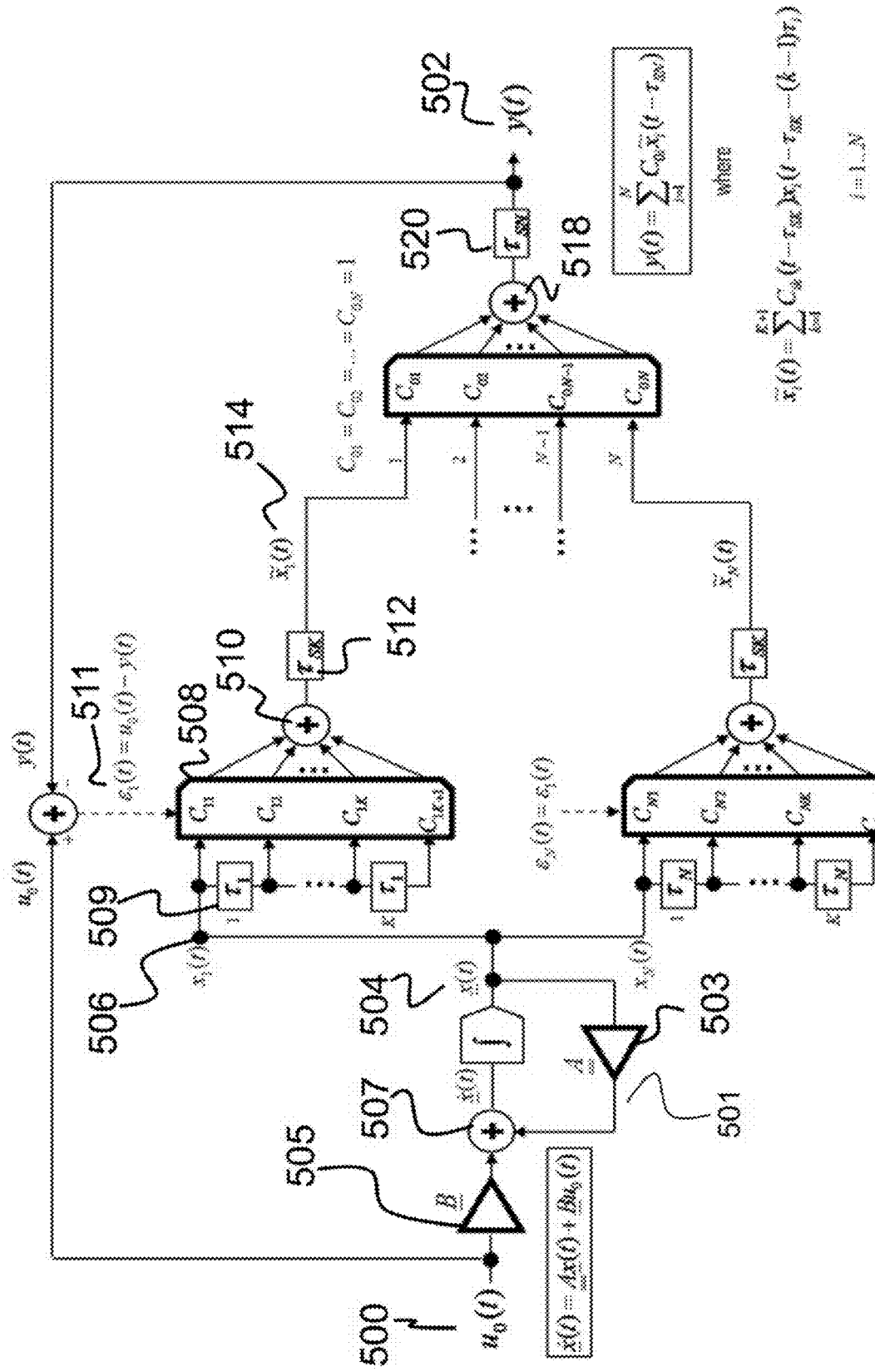
FIG. 5 is an illustration depicting an example architecture as implemented in both MATLAB and HDL codes and used in a field-programmable gate array (FPGA) demo.

The particular architecture that was implemented in hardware description language (HDL) code and used in an FPGA demo is shown in FIG. 5. This particular architecture uses global learning rules, i.e., each error signal is the same and generated from the difference between the input and output. Specifically, FIG. 5 illustrates how the cognitive signal denoising architecture de-noises an input signal $u_0(t)$ 500 to produce an output signal y(t)502. The input signal $u_0(t)$ 500 is sent into the reservoir 501. At each time step, the reservoir state x(t) is the summation 507 of the previous reservoir state multiplied by the transition matrix A 503 and the input signal 500 multiplied by the input-to-reservoir mapping matrix B 505. The reservoir state vector x(t) 504 is then split into individual elements $x_1(t), \ldots, x_N(t)$ 506, and for each reservoir state element $x_i(t)$ 506, a time history of its dynamics is created by applying a length-K delay embedding 509. The delay embedded reservoir state element $x_i(t), x_i(t-\tau_i), \ldots, x_i(t-K\tau_i)$ (i.e., delay embedded state signal) is multiplied by tunable output weights $C_{i1}, \ldots, C_{i(K+1)}$, 508 summed 510 together and delayed by $\tau_{SK}$ 512 to obtain denoised reservoir state element $\tilde{x}_i(t)$514. The denoised reservoir state elements 514 are them summed 518 together, and delayed by $\tau_{SN}$ 520 to obtain the denoised output signal y(t) 502. Alternatively, one can apply a weighted sum to the de-noised reservoir state elements, although this is not done in the example provided in the reduction to practice discussion below. The error signal ε(t) 511 is constructed by subtracting the input signal $u_0(t)$ from the output signal y(t), and this error signal 511 is used to update the output weight $C_{ij}$ 508. In the reduction to practice, the same error signal is used to update each set of output weights, but in an alternate implementation the error signals could be varied for each reservoir state element (for example, based on the different delay sizes $\tau_i$).

Figure 6:
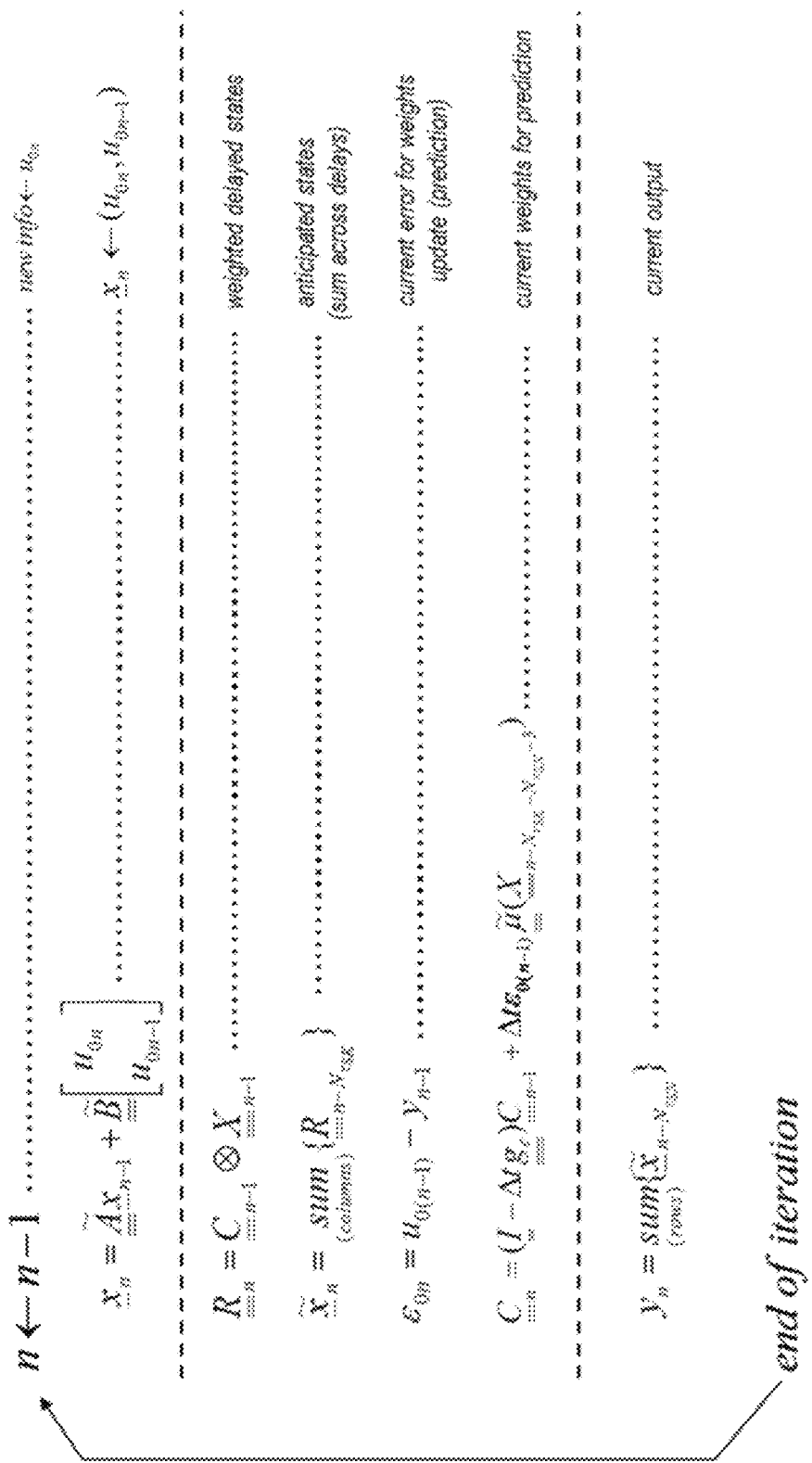
FIG. 6 is an illustration depicting an FPGA version of an iterative algorithm according to various embodiments of the present invention, using 1-step ahead prediction with no parallelization.

The optimized FPGA-friendly version of the iterative algorithm using 1-step ahead prediction with no parallelization is shown in FIG. 6. In this version, each required update step is achieved within one clock cycle without the need of waiting for a calculation step to be completed before a subsequent step can start. This particular form of iterative algorithm enables massively parallel implementation of the de-noising algorithm.

---

Algorithm 1:Iterative algorithm with 1-step ahead prediction

Initialization:
$x_1 = \tilde{x}_1 = \underline{0}, \underline{X} = \underline{0}, \underline{C}_1 = \underline{0}, C_{01} = 1$ Iteration:

$$\underline{x}_n = \underline{\tilde{A}} \underline{x}_{n-1} + \underline{\tilde{B}} \begin{bmatrix} u_{0n} \\ u_{0(n-1)} \end{bmatrix}$$

$$\underline{R}_n = \underline{C}_{n-1} \otimes \underline{X}_{n-1}$$

$$\tilde{x}_n = \sum_{(columns)}^{n-1} \underline{R}_{n-N_{\tau_{SK}}}$$

$$\varepsilon_{on} = u_{0(n-1)} - y_{n-1}$$

$$\underline{C}_n = (1 - \Delta t g_c)\underline{C}_{n-1} + \Delta t \tilde{\mu} \varepsilon_{0(n-1)}(\underline{X}_{n-N_{\tau_{SK}}-N_{\tau_{SN}}-3})$$

$$y_n = \sum_{(rows)} \tilde{x}_{n-N_{\tau_{SN}}}$$

---

In Algorithm 1 above, $\underline{\tilde{A}}$ is an m×m matrix specifying the set of mixing weights that govern the reservoir dynamics, $\underline{\tilde{B}}$ is an m×2 weight matrix that maps the input into the reservoir. $\underline{R}_n$ are the delay-embedded states weighted by the current output layer weight. $\tilde{x}_n$ is the set of anticipated states (summed across all delay lengths). In the system of the present disclosure, $\tilde{x}_n$ is computed from the sum of columns of $\underline{R}_n$ delayed by $N_{\tau SK}$, which is the number of clock cycles needed to perform the elementwise multiplication between $\underline{C}_n$ and $\underline{X}_n$ .. $\varepsilon_{0n}$ computes the error signal between the input and output. $\underline{C}_n$ is the next set of output layer weights computed from the current set of output layer weights multiplied by a coefficient and summed with error signal multiplied with the stored history states of the reservoir. In the system of the present disclosure, this computation uses the state history matrix $\underline{X}_n$ delayed by $N_{\tau SK}+N_{\tau SN}+3$ in order to ensure that computation does not have to wait until $\underline{X}_{n-1}$ is available. The next output, $y_n$, is computed by summing across the element wise multiplication of the output layer weights multiplied with their respective stored history value of the reservoir state. The CSP described herein uses in the computation of $y_n$ the anticipated states $\tilde{x}_n$ delayed by $N_{\tau SN}$ to maximize throughput in an FPGA implementation.

In order to implement the algorithm or process on either FPGA or an ASIC, the design had to be mapped to a hardware description language (HDL) which is a textual format for describing electronic circuits and systems, used extensively for logic synthesis. In this example, Verilog HDL files were used which could then be compiled by any number of tools which would interpret the files and map them to physical resources on the either the FPGA or ASIC. The architecture was naturally constructed by modularizing the design based on the files listed in the table as illustrated in FIG. 7A. The table depicts the relevant file name as well as a brief description of what the module does.

(4.4) Reduction to Practice

The CSP described herein was implemented for experimental purposes on a Xilinx Virtex-7 FPGA VC707 Evaluation Kit. The Virtex-7 FPGA is produced by Xilinx, Inc., located at 2100 Logic Drive, San Jose, Calif. 95124-3400. The Virtex-7 FPGA was chosen simply because it is one of the fastest FPGA currently on the market. For example, the Virtex-7 FPGA has a maximum clock rate of 600-700 MHz. This FPGA also has 2800 DSP slices which are used for high performance multiplication and used extensively within the denoising algorithm.

Figure 7B:
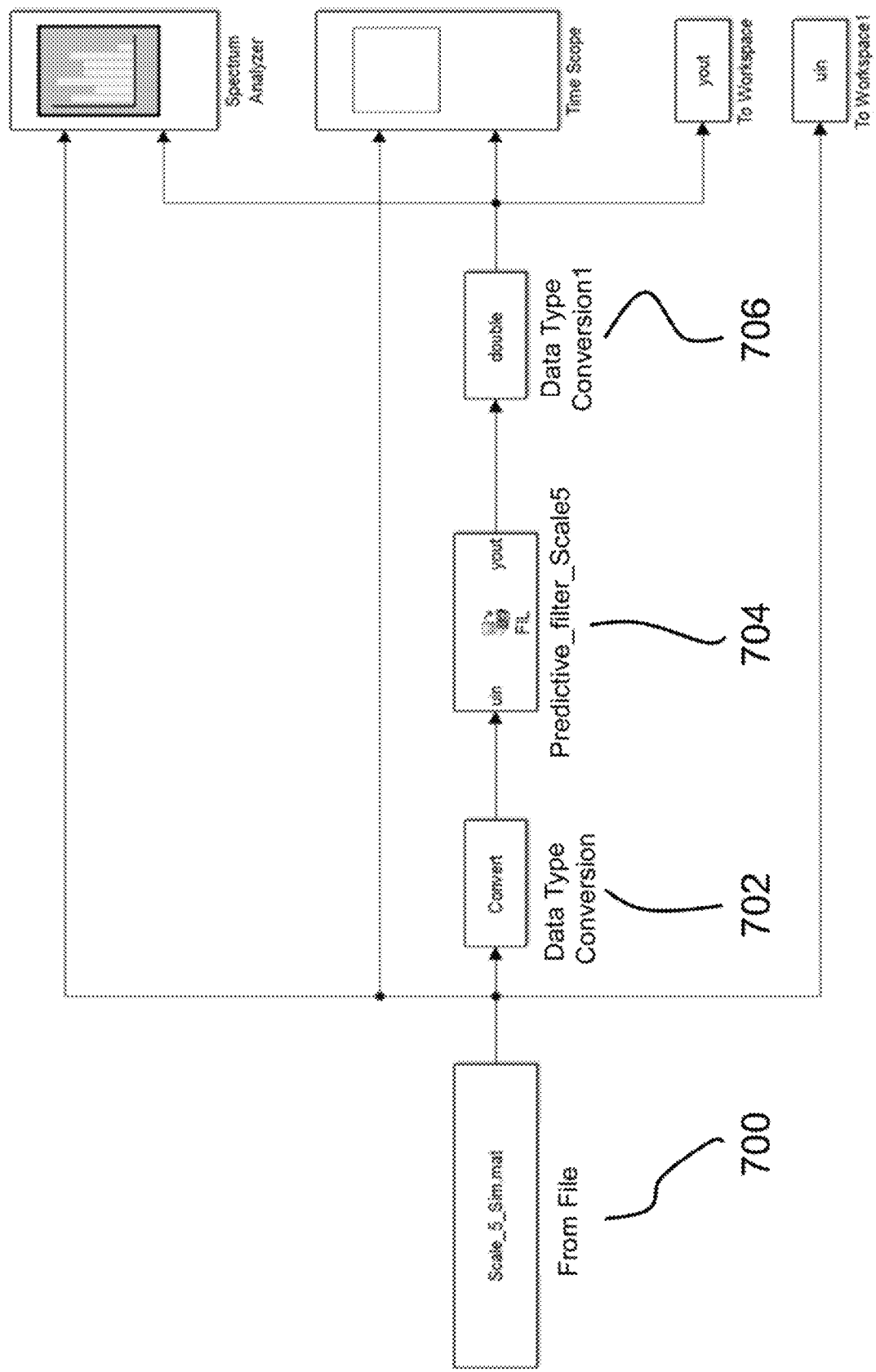
FIG. 7B is a flowchart depicting a Simulink setup incorporating the cognitive signal processor (CSP) according to various embodiments of the present invention.

Matlab's HDL Verifier toolbox was used in order to validate the denoising algorithm on hardware. Specifically, the FPGA-in-the-Loop (FIL) feature which enables synchronized Simulink or Matlab simulation running directly on a Xilinx FPGA board. HDL Verifier supports FIL verification over Ethernet, JTAG or PCI-Express. For the test setup, PCIe was used as it offers the highest data rate of all the methods. The flowchart of the Simulink setup with the CSP of the present disclosure is depicted in FIG. 7B. Specifically, FIG. 7B illustrates the block diagram for the Simulink setup used to interface with a FPGA board and validate the algorithm on hardware. The input dataset is read from the 'Scale_5_Sim.mat' block 700 where it is converted from floating-point through the 'Convert' block 702. The data is then sent to the algorithm implemented on FPGA represented by the 'FIL' block 704. The results from the FPGA are sent back to Simulink and converted back to floating-point through the 'double' block 706. All results are plotted and saved through the remaining blocks.

Test data and scenarios are generated directly in Matlab and fed directly into the FPGA board through PCIe. Output data from the FPGA algorithms are returned to Simulink/Matlab through PCIe where they can be plotted in real time. The main benefit of going with a test setup using FIL, is that complex waveforms can be generated and tested in Matlab without the need for expensive test equipment to verify correct functionality of algorithms.

To demonstrate the hardware implementation of the denoising algorithm, a 40-node design was constructed with the intention of verifying on FPGA. For the input and output, 16-bits were used in the format of Q0.15. The states were 16-bits and of Q1.14 format, while the coefficients for system matrices and multiplier coefficients used to compute the next set of output layer weights were 24-bits of the format Q0.23. Further, a delay embedding factor of 16 was used.

Figure 8:
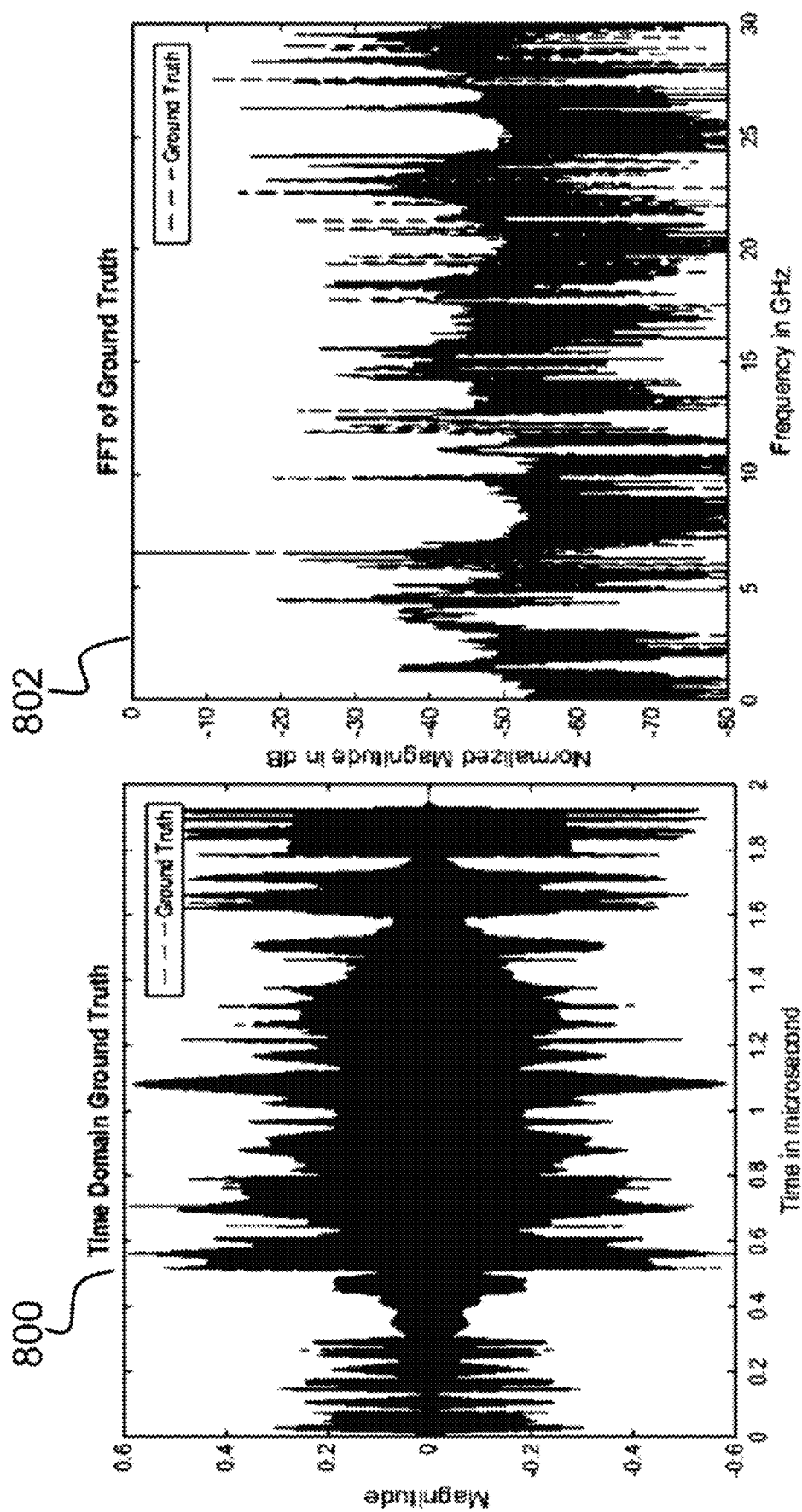
FIG. 8 illustrates ground truth in both time domain and a Fast Fourier Transform (FFT) for complex wideband pulse sequence before noise was added.

For a first demonstration, a complex wideband overlapping pulse sequence was created in Matlab. This created scenario consisted of 81 pulses over a simulated 30 GHz bandwidth. Noise was added to the pulse sequence to create 0 dB SNR, where 76 of the pulses were below the +12 dB noise floor. All of the pulses except one lasted less than 100 ns, with 80% of them overlapping in time. The scenario included frequency and phase modulation as well as linear chirps. The scenario described can be seen in the following figure before noise is added and serves as a ground truth for the desired output of the denoising algorithm implemented on FPGA. Specifically, FIG. 8 illustrates ground truth for complex wideband pulse sequence before noise was added in both time domain 800 and a Fast Fourier Transform (FFT) 802.

Figure 9:
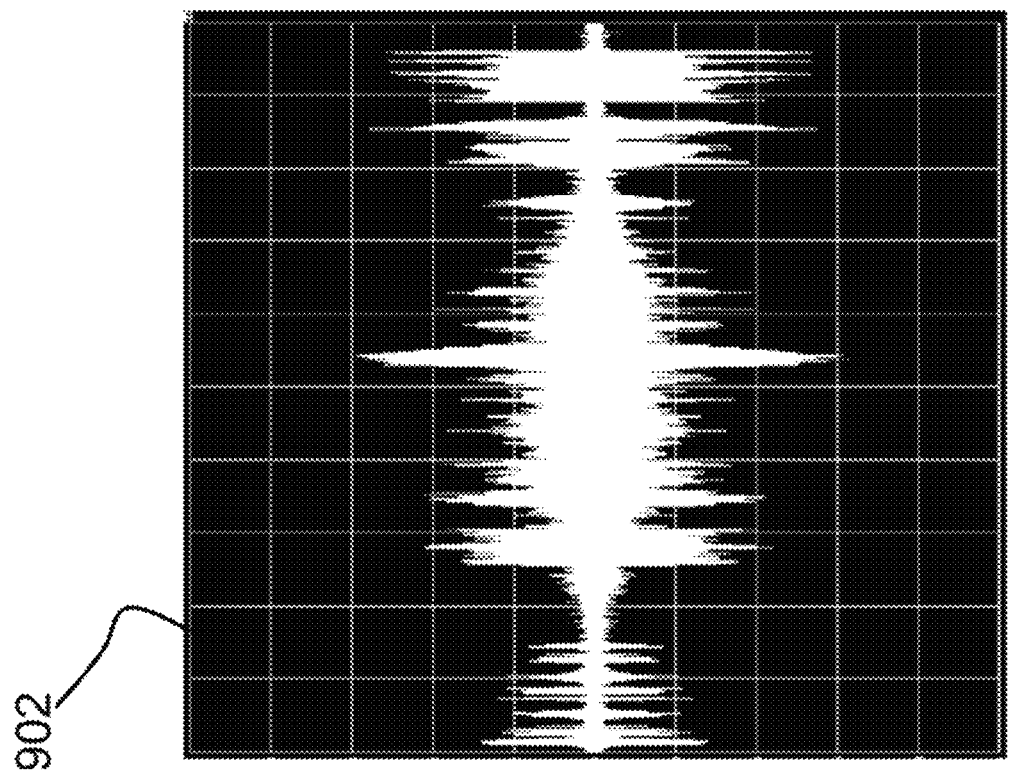
FIG. 9 illustrates demonstration results of an FPGA-in-the-Loop de-noising, showing input to the de-noiser (i.e., CSP) and resulting output.
Figure 9:
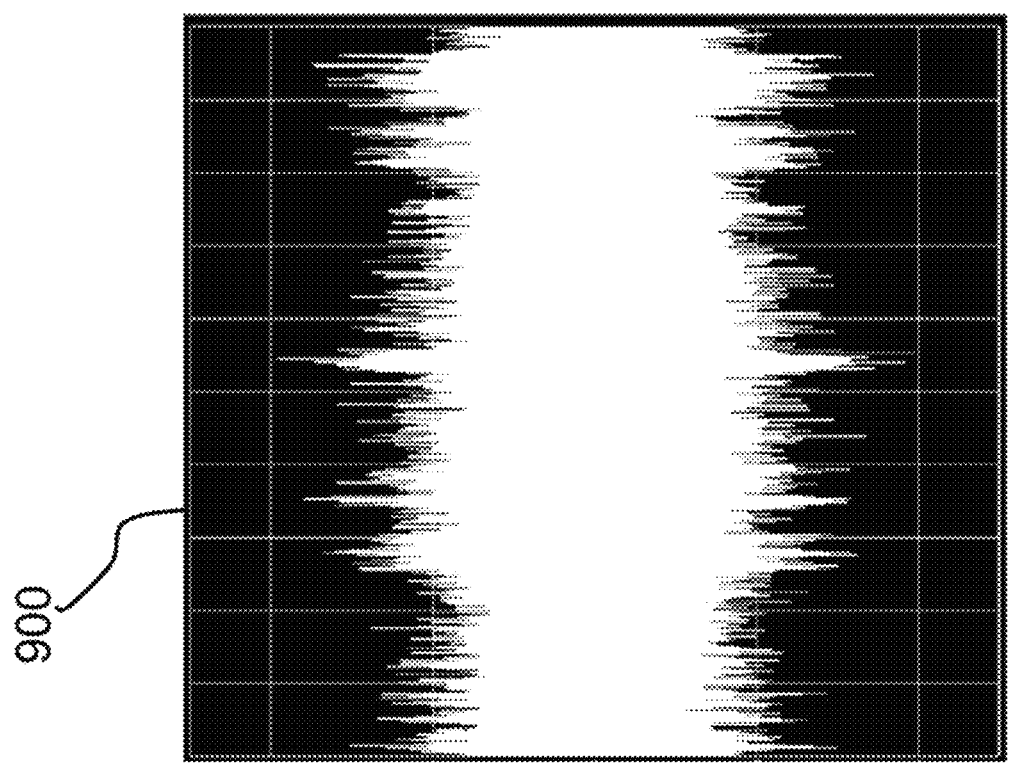

After noise was added to the baseline pulse sequence, the input data was quantized to Q0.15 to match in the input bit width of the FPGA implemented de-noising algorithm. The input and output of the FPGA were plotted on the Simulink time domain scope as shown in FIG. 9. Specifically, FIG. 9 illustrates demonstration results of an FPGA-in-the-Loop de-noising, showing input to de-noiser 900 and resulting output 900.

Figure 10:
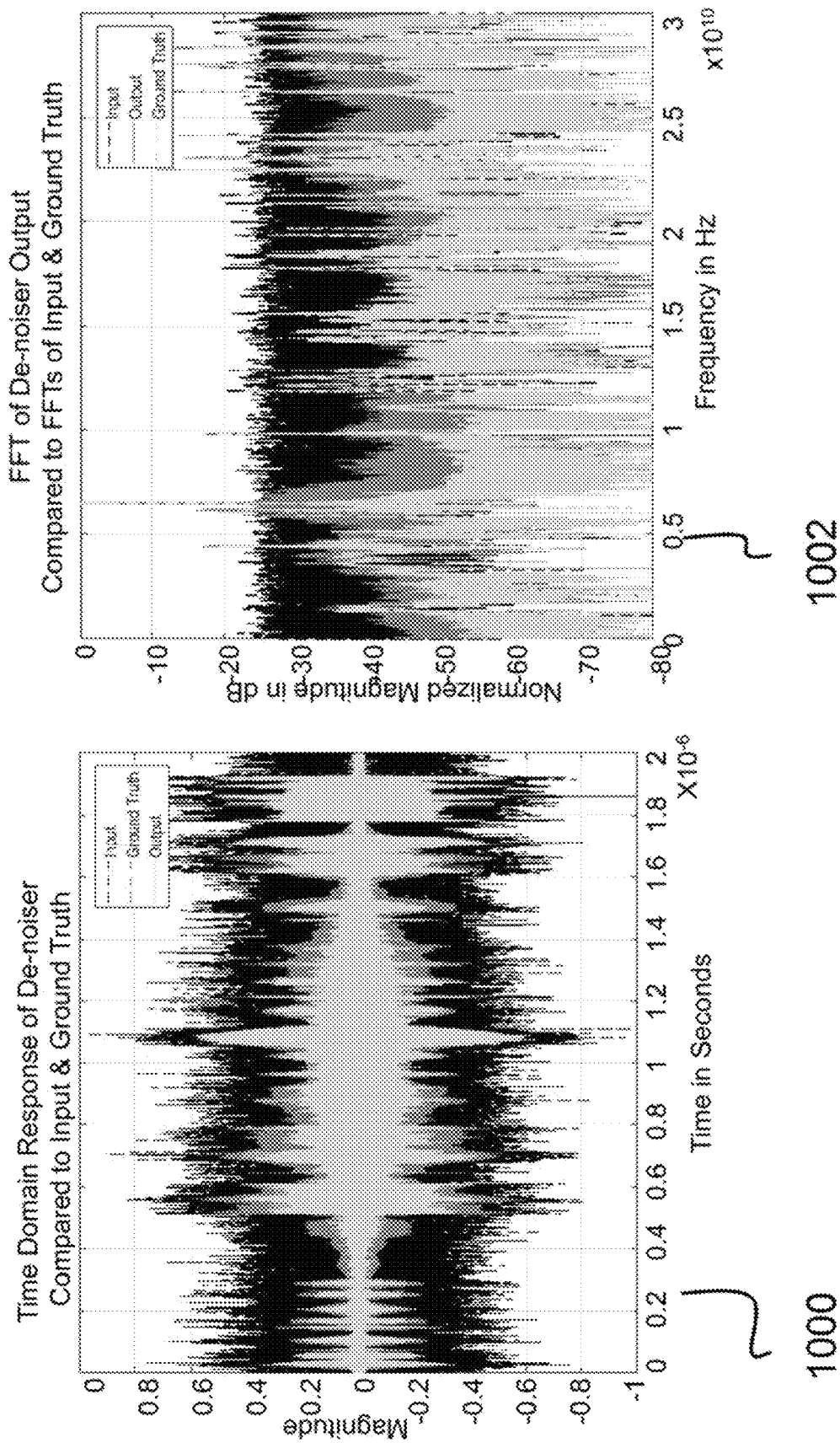
FIG. 10 illustrates both a time domain response and FFT response of the de-noiser compared to input and ground truth.

For comparison and as shown in FIG. 10, the captured FPGA output sequence was overlaid with the original desired sequence. Specifically, FIG. 10 illustrates both a time domain response 1000 and FFT response 1002 of the de-noiser (i.e., CSP) compared to input and ground truth. From the overlay, the 40-node system does well when compared to the original sequence. As the number of nodes increases the results will approach the desired results.

Figure 11:
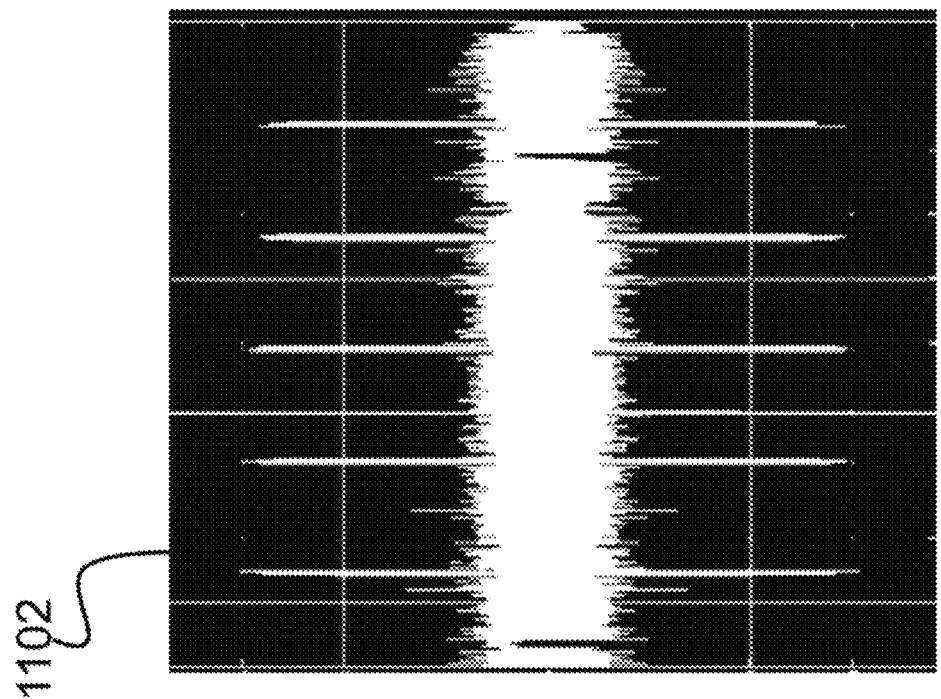
FIG. 11 illustrates demonstration results of an FPGA-in-the-Loop de-noising demonstration showing 1-bit input to the de-noiser and resulting output.
Figure 11:
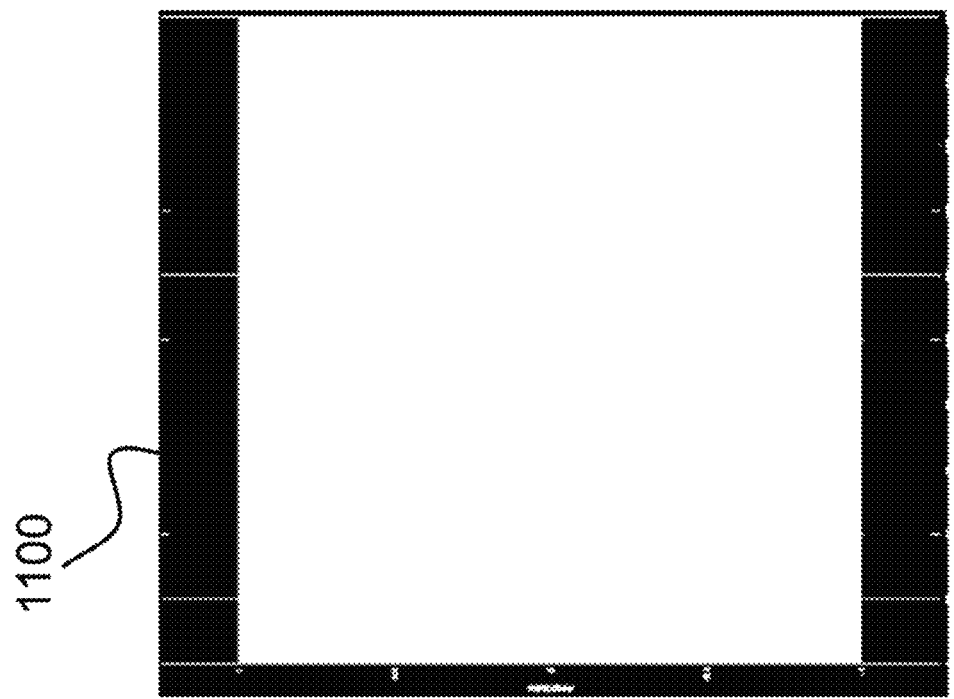
Figure 12:
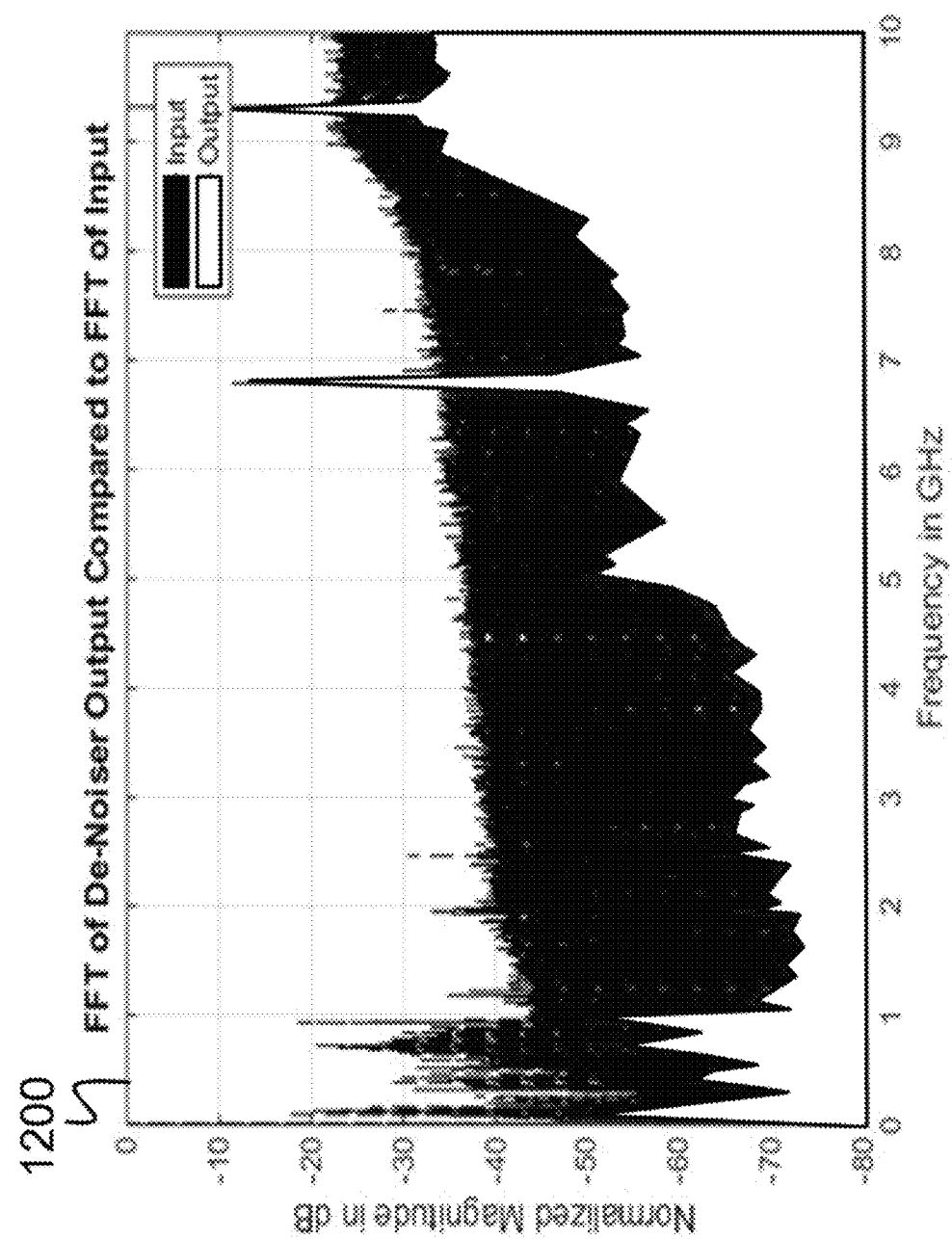
FIG. 12 illustrates a frequency domain plot of a de-noised output to a subset of the 1-bit data sequency obtained from a particular land point.

For a second demonstration, a 1-bit delta-sigma encoder captured real field test data at a particular land point while pointed at into a bay using the SURE1 receiver at frequencies over 10 GHz. Like the high density pulse case scenario demoed, the 1-bit sequence was quantized to a 16-bit Q0.15 format and streamed through the same 40-node de-noising algorithm on FPGA. Unlike the previous demo, there was no ground truth for comparison. The results for a subset of the original multi-gigabit data set is shown in the FIG. 11. Specifically, FIG. 11 illustrates demonstration results of an FPGA-in-the-Loop de-noising demonstration showing 1-bit input 1100 to the de-noiser and the resulting output 1102. For further verification, performing a FFT on the output data sequence shows a strong presence of signals at 6.8 GHz and 9.3 GHz. Specifically, FIG. 12 illustrates a frequency domain plot 1200 of de-noised output to a subset of the 1-bit data sequency obtained from the particular land point.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A cognitive signal processor for signal denoising, the cognitive signal processor comprising:
a field programmable gate array (FPGA), the FPGA configured to perform operations of:
receiving a continuous noisy signal, the continuous noisy signal being a time-series of data points from a mixture signal of waveforms having both noise and a desired waveform signal;
linearly mapping the continuous noisy signal to reservoir states of a dynamical reservoir;
generating a high-dimensional state-space representation of the continuous noisy signal by digitally combining the continuous noisy signal with the reservoir states, wherein the continuous noisy signal is approximated over a time interval based on a linear basis function;
generating one or more delay-embedded state signals based on the reservoir states; and
denoising the continuous noisy signal by removing the noise from the desired waveform signal, resulting in a denoised waveform signal.

2. The cognitive signal processor as set forth in claim 1, wherein the dynamical reservoir includes an output layer having a set of summing nodes, each summing node receiving a weighted output from each delay-embedded state signal and summing the weighted output to generate the denoised waveform signal.

3. The cognitive signal processor as set forth in claim 2, wherein the dynamical reservoir includes an error function used to create the weighted output, the error function being a difference between a current continuous noisy signal and a current output layer.

4. The cognitive signal processor as set forth in claim 3, wherein the error function updates weights used in generating the weighted output, the weights being updated with the error function based on gradient descent.

5. The cognitive signal processor as set forth in claim 1, further comprising an operation of generating a real-time denoised spectrogram of the continuous noisy signal for further processing.

6. The cognitive signal processor as set forth in claim 1, wherein the dynamical reservoir is a recurrent neural network with a plurality of nodes.

7. The cognitive signal processor as set forth in claim 1, wherein the dynamical reservoir includes a connectivity matrix having a block diagonal structure.

8. A computer program product for signal denoising, the computer program product comprising:
a non-transitory computer-readable medium having executable instructions encoded thereon, such that upon execution of the instructions by one or more processors, the one or more processors perform operations of:
receiving a continuous noisy signal, the continuous noisy signal being a time-series of data points from a mixture signal of waveforms having both noise and a desired waveform signal;
linearly mapping the continuous noisy signal to reservoir states of a dynamical reservoir;
generating a high-dimensional state-space representation of the continuous noisy signal by digitally combining the continuous noisy signal with the reservoir states, wherein the continuous noisy signal is approximated over a time interval based on a linear basis function;
generating one or more delay-embedded state signals based on the reservoir states; and
denoising the continuous noisy signal by removing the noise from the desired waveform signal, resulting in a denoised waveform signal.

9. The computer program product as set forth in claim 8, wherein the dynamical reservoir includes an output layer having a set of summing nodes, each summing node receiving a weighted output from each delay-embedded state signal and summing the weighted output to generate the denoised waveform signal.

10. The computer program product as set forth in claim 9, wherein the dynamical reservoir includes an error function used to create the weighted output, the error function being a difference between a current continuous noisy signal and a current output layer.

11. The computer program product as set forth in claim 10, wherein the error function updates weights used in generating the weighted output, the weights being updated with the error function based on gradient descent.

12. The computer program product as set forth in claim 8, further comprising an operation of generating a real-time denoised spectrogram of the continuous noisy signal for further processing.

13. The computer program product as set forth in claim 8, wherein the dynamical reservoir is a recurrent neural network with a plurality of nodes.

14. The computer program product as set forth in claim 8, wherein the dynamical reservoir includes a connectivity matrix having a block diagonal structure.

15. A computer implemented method for signal denoising, the method comprising an act of:
causing one or more processors to execute instructions encoded on a non-transitory computer-readable medium, such that upon execution, the one or more processors perform operations of:
receiving a continuous noisy signal, the continuous noisy signal being a time-series of data points from a mixture signal of waveforms having both noise and a desired waveform signal;
linearly mapping the continuous noisy signal to reservoir states of a dynamical reservoir;
generating a high-dimensional state-space representation of the continuous noisy signal by digitally combining the continuous noisy signal with the reservoir states, wherein the continuous noisy signal is approximated over a time interval based on a linear basis function;
generating one or more delay-embedded state signals based on the reservoir states; and
denoising the continuous noisy signal by removing the noise from the desired waveform signal, resulting in a denoised waveform signal.

16. The method as set forth in claim 15, wherein the dynamical reservoir includes an output layer having a set of summing nodes, each summing node receiving a weighted output from each delay-embedded state signal and summing the weighted output to generate the denoised waveform signal.

17. The method as set forth in claim 16, wherein the dynamical reservoir includes an error function used to create the weighted output, the error function being a difference between a current continuous noisy signal and a current output layer.

18. The method as set forth in claim 17, wherein the error function updates weights used in generating the weighted output, the weights being updated with the error function based on gradient descent.

19. The method as set forth in claim 15, further comprising an operation of generating a real-time denoised spectrogram of the continuous noisy signal for further processing.

20. The method as set forth in claim 15, wherein the dynamical reservoir is a recurrent neural network with a plurality of nodes.

21. The method as set forth in claim 15, wherein the dynamical reservoir includes a connectivity matrix having a block diagonal structure.

* * * * *